(12) United States Patent
Kowalski et al.

(10) Patent No.: US 7,333,246 B1
(45) Date of Patent: Feb. 19, 2008

(54) METHOD AND SYSTEM FOR IMPOSING PRINT DATA

(75) Inventors: Jacek Kowalski, Troisdorf (DE); Petra Wegele, Poing (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 10/019,853

(22) PCT Filed: May 5, 2000

(86) PCT No.: PCT/EP00/04041

§ 371 (c)(1),
(2), (4) Date: Apr. 25, 2002

(87) PCT Pub. No.: WO00/68877

PCT Pub. Date: Nov. 16, 2000

(30) Foreign Application Priority Data

May 7, 1999 (DE) .................................. 199 21 120

(51) Int. Cl.
| | |
|---|---|
| H04N 1/387 | (2006.01) |
| H04N 1/401 | (2006.01) |
| G06F 15/82 | (2006.01) |
| G06F 15/76 | (2006.01) |
| G06K 1/00 | (2006.01) |
| B41J 15/00 | (2006.01) |
| B41J 11/00 | (2006.01) |
| B65H 39/00 | (2006.01) |
| B41L 43/04 | (2006.01) |

(52) U.S. Cl. .................. 358/452; 358/1.18; 358/401; 358/449; 270/52.14; 270/52.07; 270/41

(58) Field of Classification Search ................... None
See application file for complete search history.

(56) References Cited

U.S. PATENT DOCUMENTS

| | | | | |
|---|---|---|---|---|
| 2,631,845 | A | * | 3/1953 | Zuckerman ................ 270/5.02 |
| 4,672,462 | A | | 6/1987 | Yamada |
| 5,105,283 | A | * | 4/1992 | Forest et al. ................ 358/401 |
| 5,398,289 | A | | 3/1995 | Rourke et al. |
| 5,495,561 | A | * | 2/1996 | Holt ........................ 358/1.15 |
| 5,774,363 | A | * | 6/1998 | Sato et al. .................... 700/97 |

(Continued)

FOREIGN PATENT DOCUMENTS

EP  0 608 685 A1  8/1994

(Continued)

OTHER PUBLICATIONS

"Folding Techniques" Brochure.

*Primary Examiner*—Twyler Lamb
*Assistant Examiner*—Myles D. Robinson
(74) *Attorney, Agent, or Firm*—Schiff Hardin LLP

(57) ABSTRACT

A method, system and computer program provides for making an image area correction in a printing system. Print data is provided in a logical page order corresponding to at least one signature for printing. At least one parameter of a recording medium on which the print data are printed is determined, this parameter being relevant to the position of the printing format on the recording medium, which is folded according to the signature. The position of the pages is then corrected according to this parameter prior to printing, in such a way that the print formats of successive pages of the finished signature are positioned accurately.

11 Claims, 14 Drawing Sheets

U.S. PATENT DOCUMENTS

| | | | |
|---|---|---|---|
| 6,099,225 A * | 8/2000 | Allen et al. | 412/32 |
| 7,177,045 B2 * | 2/2007 | Goel | 358/1.18 |
| 2001/0039554 A1* | 11/2001 | Iwasaki | 707/525 |
| 2002/0016803 A1* | 2/2002 | Ryan et al. | 707/527 |
| 2002/0018239 A1* | 2/2002 | Ahrens | 358/1.18 |
| 2003/0189718 A1* | 10/2003 | Yamamura | 358/1.13 |
| 2004/0218217 A1* | 11/2004 | Dechamps | 358/1.18 |

FOREIGN PATENT DOCUMENTS

| | | |
|---|---|---|
| EP | 0 741 877 B1 | 11/1996 |
| JP | 63085559 A * | 4/1988 |
| WO | WO 95/20185 | 7/1995 |

\* cited by examiner

METHOD AND SYSTEM FOR IMPOSING PRINT DATA

BACKGROUND OF THE INVENTION

1. Field of the Invention

The present invention is directed to a method and to a system for the imposition of print data, particularly for processing a digital print data stream.

2. Description of the Related Art

A special area, what is referred to as "Print on Demand" (PoD) has arisen in the field of digital printing. A corresponding POD system has been described, for example, under the title "Entwicklung neuer Medien-Konzepte für POD-Dienstleister" in the periodical Deutscher Drucker, No. 35/98 of 17 Sep. 1998.

Compared to conventional offset book printing, the advantages of such POD systems are that printed matter can be produced in a short time (just-in-time). Small editions of about 2 through 2000 copies can thus be economically published. A specific, currently required number of books can thus be printed in a short time on demand. Costs for warehousing as well as for remainders of books can thus be eliminated.

On the other hand, there is the necessity in POD systems of likewise designing the layout of the printout in high-performance fashion, particularly the imposition of the print data. Whereas a relatively great deal of time is available for these procedures in conventional book printing, this procedure must be accomplished in a relatively short time in POD systems in order to be able to achieve the aforementioned advantages of a just-in-time production. This requirement is countered, on the one hand, by the fact that there are numerous setting possibilities and demands during the course of a print production of books or bound brochures. In a POD printing system, a post-processing system following the printer device is usually connected, this compiling the material printed by the printing system to form a printed document such as a book or a brochure. For example, a saddle binder or a spiral binder can be provided following the printer device so that the printed pages are bound therewith to form a book or a brochure.

Further, a folding device can be provided between the printer device that prints the recording medium and the binding system when the POD printing system generates printed matter in signatures. The fundamentals and various specific brochure "Folding Techniques" issued by Stahl GmbH, a subsidiary of Heidelberger Druckmaschinen AG, 69115 Heidelberg, Order No. 1-800-437-7388 (Heidelberger). The content of this document is herewith incorporated by reference into the present specification. Various signature strategies and imposition patterns connected therewith are described in this document for sheet-fed printing systems and web-fed printing systems.

As already mentioned above, there is the demand in POD systems to implement the print data and, thus, the imposition event as well as in as high-performance a manner as possible, i.e. fast and largely automated. Accordingly, there is also the demand to design imposition patterns, i.e. the arrangement of the page sequence on the recording medium or, respectively, signature in as fully automated a manner as possible such that both the page sequence as well as the position of the print image on the pages of the ultimately produced printed matter (book, brochure or the like) exactly corresponds to the reading sequence. A further demand is to thereby achieve a specific registration precision of successive pages in the printed matter. This demand is opposed by the shift of the print image in signature printing caused by folding the signature and cutting the edges.

U.S. Pat. No. 4,672,462 discloses a method and a system for recording a plurality of images on a light-sensitive film, whereby the images correspond to several pages of conventional book bindings. The layout of the print images is adapted to the binding before the exposure in conformity with the prescriptions of an operator.

European Patent reference EP-A-741 877 B1 or, respectively, International Published Application WO-A-95/20185 corresponding thereto discloses a printing system wherein various post-processing systems for processing the page stream printed on the paper through a device for binding documents are connected to a printer device.

European Patent reference EP-A-0 608 685 discloses a device for producing brochures from images that have been read in. For generating printed pages according to prescriptions, the images are automatically turned and adapted in terms of their dimensions.

U.S. Pat. No. 5,398,289 discloses a method and a system for printing signatures. Upon output of individual sheets having up to four print pages, a position of the print images in the printing that is not exactly registered is corrected, this position having arisen as a result of a folding of the signature at the back margin. However, U.S. Pat. No. 5,398,289 discloses no possibility for correcting the print image shift on sheets caused by folding, said sheets having a plurality of fold axes for producing signatures.

SUMMARY OF THE INVENTION

An object of the present invention is to assure the registration precision of printed pages in printed matter produced with signatures even given a plurality of folds of the sheet, whereby rejects are to be avoided.

This object is achieved by a method for signature-by-signature editing of print data in which the print data are edited for printing on at least one sheet in a logical page sequence corresponding to at least one signature, the signature forming a section of the printed product and containing a plurality of pages; at least one parameter of the recording medium on which the print data are printed and that is relevant for the position of the print image on the recording medium being folded in signatures is defined;

and a position correction of the respective print image on the pages is implemented before the printing step dependent on the parameter, whereby the folds of the sheet needed for producing the signature are computationally simulated with the assistance of a computer program so that the print images of successive pages of the folded signature lie exactly registered above one another, the folds ensuing in two directions perpendicular to one another, and the correction ensuing in the two directions perpendicular to one another.

In a preferred method, the folds of the signature are computer-simulated for the position correction and the correction values for the print image of a page are calculated from the influence of each fold on the print image of at least this page. Specifically, the folds are simulated page-by-page with ascending or descending page numbers, whereby pairs of successive page numbers are respectively formed that, due to the signatures, come to lie on one another as a result of a fold and/or between which a fold is provided due to the signature. A successive check is carried out to see whether a physical fold of the sheet is possible as a result whereof the pages of a page pair of successive pages are arranged in reading sequence after the sheet is folded to form the signature, whereby, when a fold is possible, a data-oriented fold is implemented and the page pair is entered in a list when a physical fold cannot be implemented. In one embodiment, the page pairs present in the list are processed with priority over the other page pairs until a non-foldable page pair in the list is processed.

The thickness of the recording medium may be acquired as parameter. Further, all signatures of the printed recording medium that belong together are bound to form a print product.

The present invention also provides a printing system including at least one computer and a printer device for the implementation of a method according to the preceding. In the printing system, at least one post-processing device that cuts, folds and/or binds a recording medium printed by the printer device is provided to form a print product. A particular embodiment provides that the binding ensues in signatures.

Additionally, the present invention provides a computer program product for the implementation of method as set forth above. The computer program product has a data carrier, a datafile, a computer program module or a command sequence and/or a signal sequence. A computer on which a computer program product according to the foregoing is loaded is also provided.

According to a first aspect of the invention, print data are edited in a logical page sequence corresponding to one or more signatures. The editing can ensue with a production process for printed matter (work flow), for example in a host computer, in a computer (a print server) preceding a printer device or on some other workstation as well (a client computer). In particular, the editing ensues as an imposition pattern in a production control program.

Further, it is inventively provided to implement a position correction of the imposed pages such that the print images of successive pages lie exactly registered relative to one another in the folded signature, i.e. in the finished printer matter. This position correction is also referred to below as a type area correction.

The present invention is based on the perception that the folding of printed sheets for producing signatures can be simulated on a computer. In the invention, the folding of the sheet is computer-simulated, particularly on the basis of the distribution of the printed pages on the sheet, i.e. on the basis of the signature pattern. The shift of the page positions within the printed matter that occurs due to the multiple folding of the sheet is compensated on the basis of a parameter of the recording medium, for example its thickness or its weight. Although there are a number of sequence variations for the individual folds to be implemented for a printed sheet, each of these variations must ultimately lead to the same folded result since the reading sequence from the first page to the last page within the finished printed matter must always be the same independently of the folding sequence.

It was also inventively recognized that the physical folding of a sheet can be computer-simulated, and that an automated correction of the fold-induced shift or, respectively, of a registration imprecision of successive printed pages can be implemented under computer control in the finished printed matter.

The invention achieves the advantage that the registration precision of successive printed pages is automatically produced without having to carry out investigations or calculations at the user side. The automatic correction thus ensues dependent on the indicated imposition strategy that defines the distribution of the printed pages on the sheet as well as dependent on a further parameter dependent on the nature of the recording medium such as the specific weight, diameter and/or material thereof.

Due to the largely automatic correction, the indicated solution is extremely user-friendly and leads to what is a faster overall production of printed matter.

An algorithm that calculates the correct folding of the printed sheet and simulates the shifts of the printed page caused as a result thereof particularly works on a page-by-page basis, whereby respective pairs of successive page numbers are formed that must be folded onto one another conditioned by the signature or, respectively, conditioned by the imposition strategy. In particular, the work sequence of the algorithm is thereby performed page-by-page in a ascending or a descending page sequence. A check is thereby initially carried out to see whether a fold between the two pairs is possible on the basis of the folds that ensued previously; potentially, the folding is simulated and the correction values for a position correction that result therefrom are calculated.

One advantage of the inventive method, wherein the position correction is calculated individually for each page of each signature, is that the method can also implement an automatic position correction for unusual signature patterns produced by the operator himself. Likewise, page correction values can be stored for standard signatures as well as for standard recording media and can be directly called as warranted.

Further details of inventive, preferred correction methods or, respectively, calculation algorithms are explained in greater detail below on the basis of the Figure description.

A second aspect of the invention is directed to the executive work sequence (work flow) in the production of printed matter. It is provided during the course of the imposition of printed pages to initially subject a print data stream (for example, PCL or PostScript) to a raster process and to then further-process the rastered data page-by-page. It is initially provided during the course of this further-processing to merge information page-by-page, to overlay or crop the pages or to combine variable data with static data in the pages. The imposition of the print data ensues in the processing step following thereupon, whereby—optionally—standard signatures can be selected or individual signatures can be produced. Finally, printer-specific settings ensue, for instance the selection of input trays of the printer device as well as of the print region to be printed out.

BRIEF DESCRIPTION OF THE DRAWINGS

Further advantages and details of the invention are explained in greater detail on the basis of the Figures.

DETAILED DESCRIPTION OF THE PREFERRED EMBODIMENTS

Figure 1:
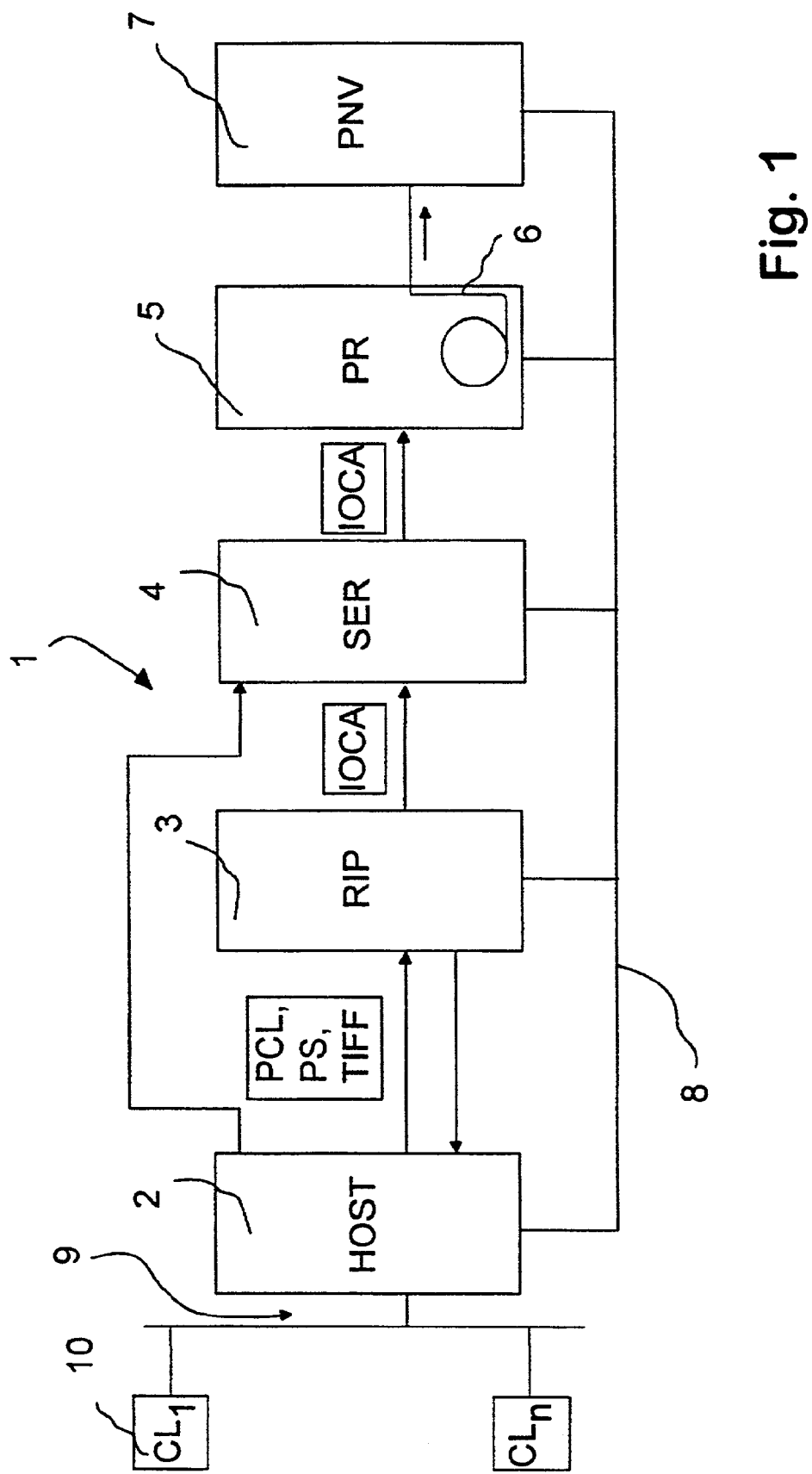
FIG. 1 is a functional block diagram showing system components of a POD printing system.

FIG. 1 shows a PoD printing system 1. It comprises a data source 2, for example a host computer, at which the print datafiles are output for printing via a network 9 (LAN, WAN) in a specific print data format, for example in PCL, PostScript or the like. These datafiles are conducted as needed to a raster image processor (RIP) 3 that converts the data of the datafiles into a pixel-based format such as, for example, TIFF or IOCA page-by-page. The page data that are generated in this fashion, for example in the IOCA format, are then supplied to the print server 4. The page data are edited job-specifically in the print server 4. In particular, the processing steps of an integration or, respectively, merging of data, the imposition as well as further processing of the imposed data thereby ensue. Data that were already rastered earlier and that are stored in the host computer 2 or in the print server 4 can also be directly employed in the integration. Another rastering process in the RIP processor 3 is then no longer necessary. Moreover, the RIP processor 3 can also be integrated in the host computer 2 or in the print server 4.

After the merging, imposition and fine processing of the imposed data, these are sent from the print server 4 to a printer device 5 and are printed therein onto a recording medium, for example onto a paper web. Any type of printer device can be fundamentally employed as the printer device 5. For example, offset printing presses or printer devices that are based on other recording principles such as, for example, an electrophotographic principle are suitable. For example, electrophotographic printers are recited in Published International Patent Applications WO 99/09459 A1 and WO 98/27466 A1. The content of these two publications is herewith incorporated by reference into the present specification. The data as well as the connected printer devices can be provided both for monochromatic as well as for polychromatic printing.

Given the electrophotographic printer device 5 shown in FIG. 1, the printed paper web 6 is supplied to a paper post-processing device 7. Thereat, the paper web 6 is cut, folded and ultimately bound to form a finished printed product, for example a book or a brochure. Even though this post-processing device 7 is shown here as a unit, it can be composed of a plurality of discrete devices, for example of a cutter device, a separate folding device and a separate binding device. The devices of the PoD printing system 1 are connected to one another in control-oriented terms by a common control line 8. A master device, for example the print server 4, controls the production sequence.

The host computer 2 is connected to various user computers 10 (clients) via the network 9. The clients 10 can send print orders to the PoD printing system 1. Various system settings are undertaken in conjunction with the print orders. These system settings can ensue either in the client 10, in the host 2 or, preferably, in the print server 4. The work sequence for undertaking the settings with respect to the imposition of PoD print data is explained in greater detail on the basis of FIGS. 2 through 18.

Figure 2:
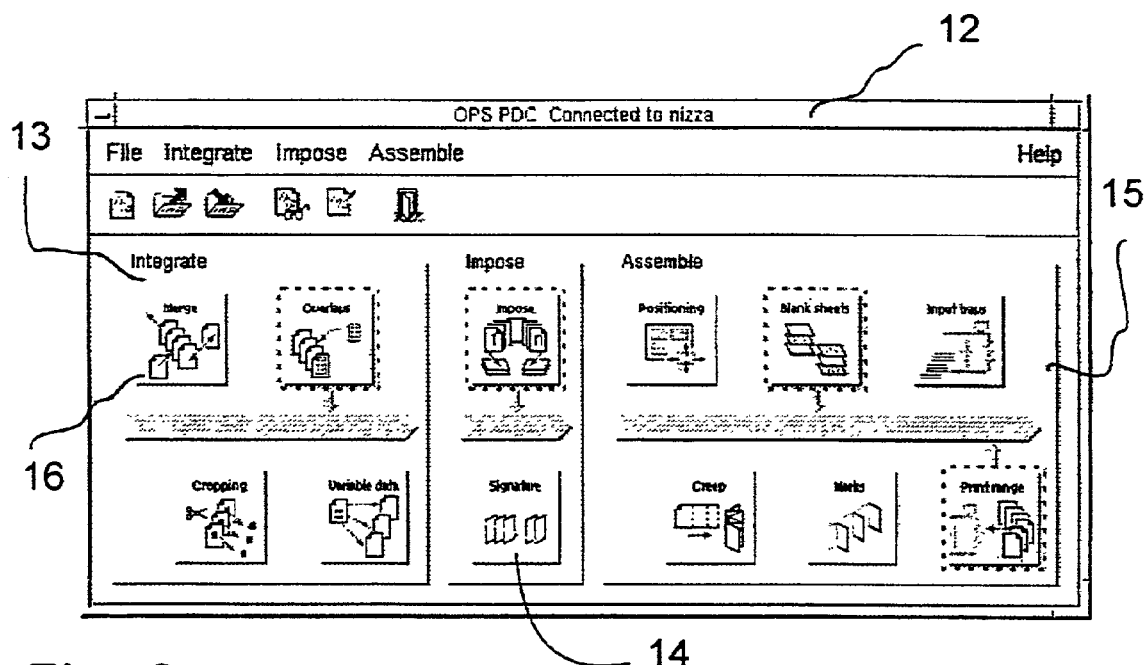
FIG. 2 shows a dialog box as displayed on a display screen with a selection menu in which the executive work sequence of an expanded imposition event becomes clear.

FIG. 2 illustrates the method sequence (work flow) in the form of a dialog box for display for producing a PoD-suited print data stream for the printer device 5.

The work sequence is first configured and then controlled by a computer program (software). The main window 12 of the running program shown in FIG. 2 is the entry menu of the running computer program for setting the system parameters, i.e. for configuring the imposition job. It comprises three workflow symbol fields 13, 14 and 15. Work sequences that mix, overlay or blank out individual data are defined in the first symbol field 13. Before the actual imposition (the impose step), the work sequence corresponding to the symbol field 13 implements manipulations on the logical page level in the later processing of the print files. Parameters that define the imposition of the edited print datafile, i.e. the build-up of new physical pages from respectively one or more logical pages as well as the re-sorting of the pages, are determined in the second symbol field 14, "impose".

The possibility of processing the data stream resulting from "integrate" and "impose" on the physical page level exists with the third symbol field 15, "assemble". For example, the page layout can be post-processed therewith in that the positioning of the logical pages or images is modified, blank sheets are inserted or marks are placed on the sheets.

Each of the three symbol fields contains a plurality of command buttons that respectively open new windows for a more detailed definition of corresponding parameters.

Figure 3:
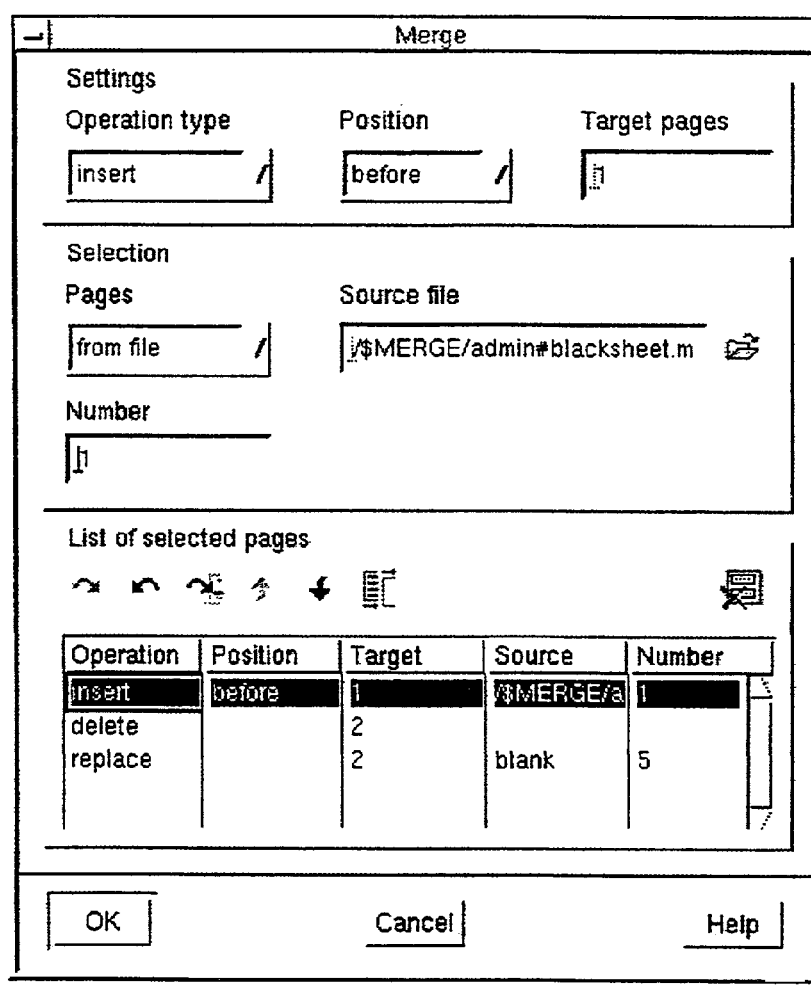
FIG. 3 shows a dialog box or selection window for mixing data.

FIG. 3 shows the window that opens upon actuation of the command button 16, "merge", in the symbol field 15 (integrate).

This window is composed of three areas. The type of insertion, its position and the pages of the print data stream to be processed are indicated in the first area, identified as "settings". What source is to brought into communication with the data stream is indicated in the second window, identified as "selection". A list of the pages and parameters selected in this way can be seen in the third field. The modification of documents thereby ensues on the basis of the individual pages.

The flexibility of the overall system not only allows the joining of specific document pages but also allows other datafiles to be mixed (overlaid) into the print data stream to be printed out. The corresponding settings are undertaken in the window shown in FIG. 5. An overlay datafile can thereby be selected, as can the corresponding pages of the document to be printed out and wherein this overlay is to be overlaid.

As a result of such a mixing, both the original page as well as the page (information) determined by the overlay can be seen in the ultimate printed product.

Figure 4:
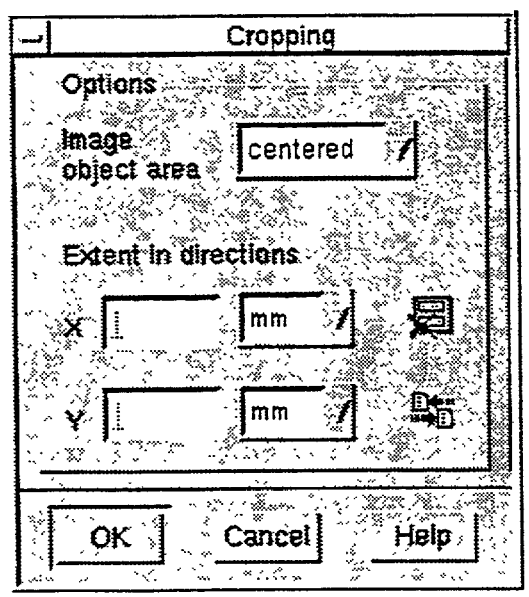
FIG. 4 shows a dialog box or selection window for cropping images.
Figure 5:
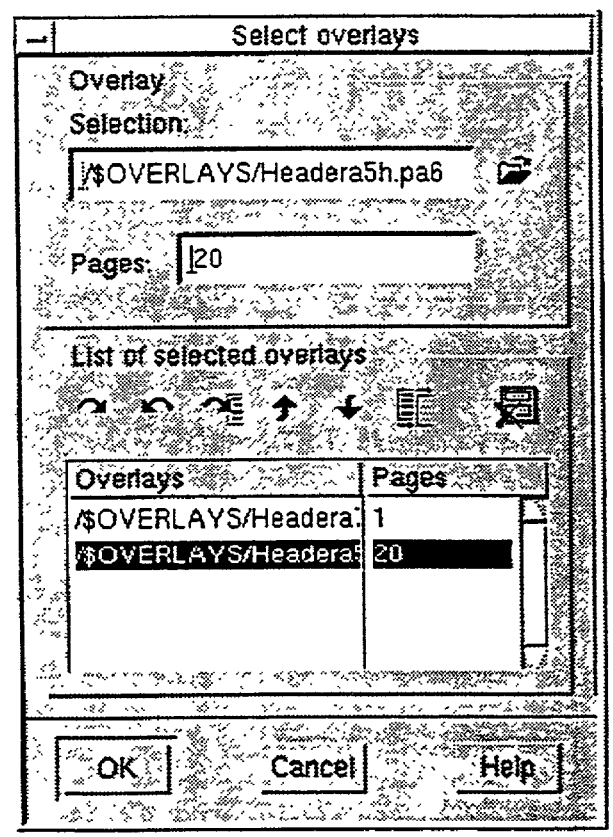
FIG. 5 shows a dialog box or selection window for the overlay of print datafiles.
Figure 6:
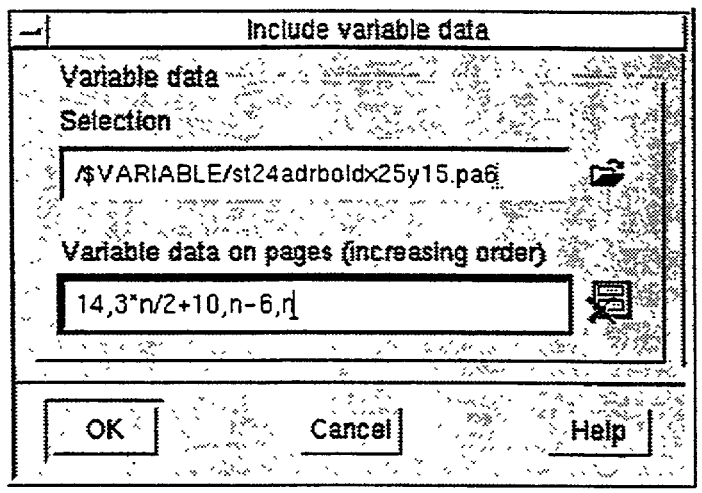
FIG. 6 shows a dialog box or selection window for linking variable data into a print data stream.

Images of the print data stream can be cropped, i.e. specific areas in the pages of the print data stream can be cut out, via the control button, entitled "cropping", or, respectively, via the selection window shown in FIG. 4. Variable data, i.e. data from an external datafile (for example, an address datafile), can be selectively linked into the print datafile in such cropped areas or into areas of the print datafiles that are already empty per se. The corresponding settings are undertaken by the window shown in FIG. 6. For example, this functionality allows a personalized printing of printed matter in that, for example, an individual, personal dedication is printed on the first page of the printed matter, for example of each book.

Figure 7:
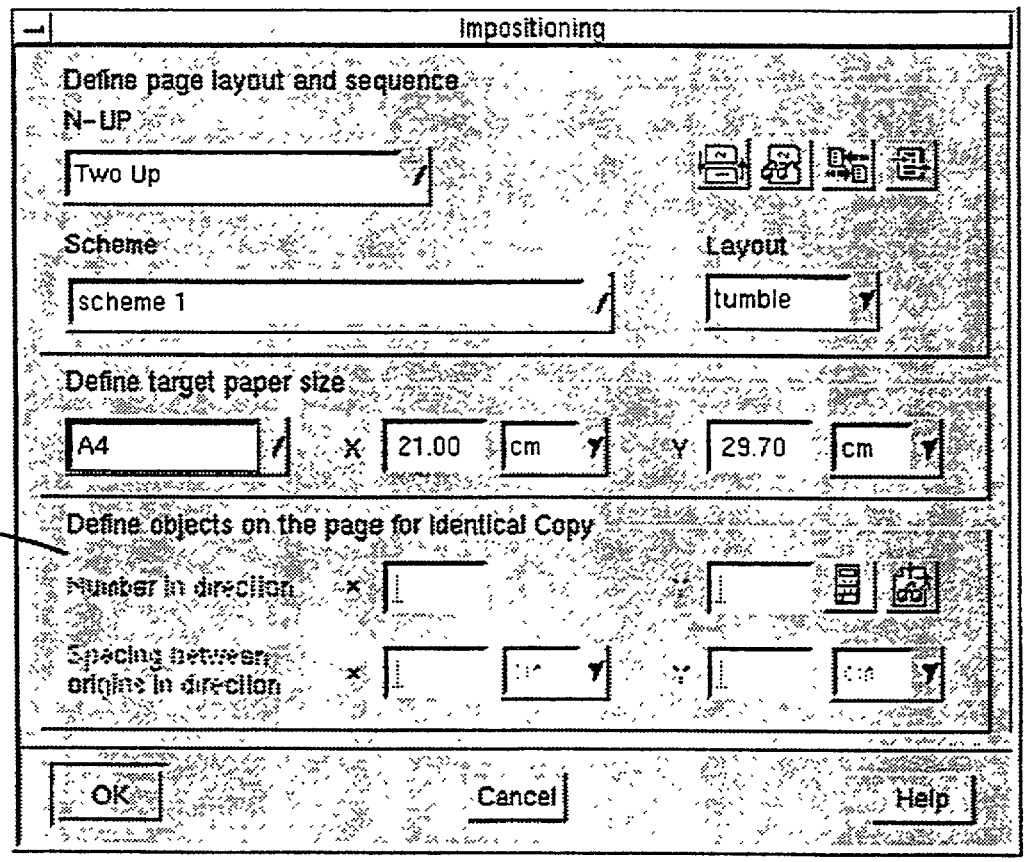
FIG. 7 shows a dialog box or selection window for defining an imposition strategy.
Figure 8:
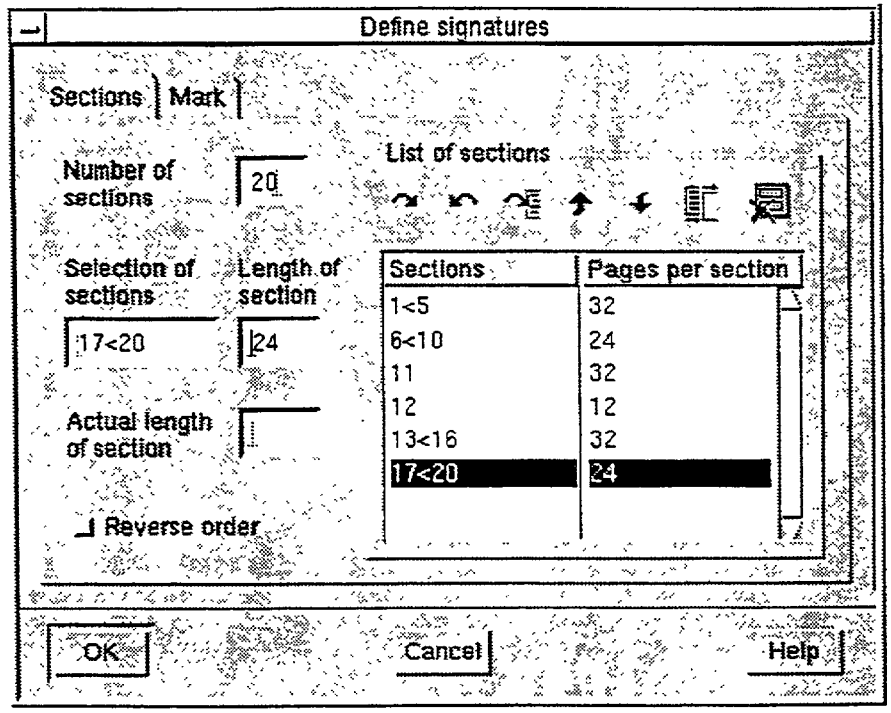
FIG. 8 shows a dialog box or selection window for selecting a signature.

The mask shown in FIG. 7 is opened with the command button, "impose". Typical imposition parameters can be set in this window, for instance N-up (one-up, two-up, two-up with identical copies, etc.) and layout (tumble, work-and-turn, etc.). Further, various predefined standard imposition patterns can be selected and called. To that end, the format of the recording medium (A4, letter, etc.) in the printer is also selected or, respectively, indicated. When the option "identical copies" in the area "N-up" was selected, the size and the position of the copied fields can be set via the area 17 ("define objects . . . "). These printing parameters within a page can be optimized as a result thereof, for example when printing calling cards.

The signature division is defined via the command button, "signatures". This ensues in the window shown in FIG. 8. The division of the total number of pages into sections (signatures) ensues via the register card, "sections". Twenty sections are provided in the illustrated example, whereby the sections 17-20 each respectively comprise 24 pages. The smallest section (number 12) comprises only 12 pages. It is thus possible to freely select the respective scope of the sections with this functionality. On the one hand, this makes it possible to optimize the sections, i.e. the signatures, to the effect that as few blank pages as possible are produced. On the other hand, smaller signatures—which are less stable than larger signatures in the bound condition—can be centrally placed in the printed matter, so that the overall work has maximum stability in the bound condition. The signature marks that are required for the later processing steps (such as folding and binding) can be defined with the second register card, "mark".

The input file (data stream) is divided according to the set signatures in the workflow. Large printed sheets that must be multiply folded in order to then form a chapter of the ultimate printed matter (for instance book or periodicals) thereby arise corresponding to the signatures. It is standard that 4 through 96 logical pages be supported for the signatures, i.e. usually multiples of four logical pages, whereby there can also be a departure from both said rules in exceptional cases.

Figure 9:
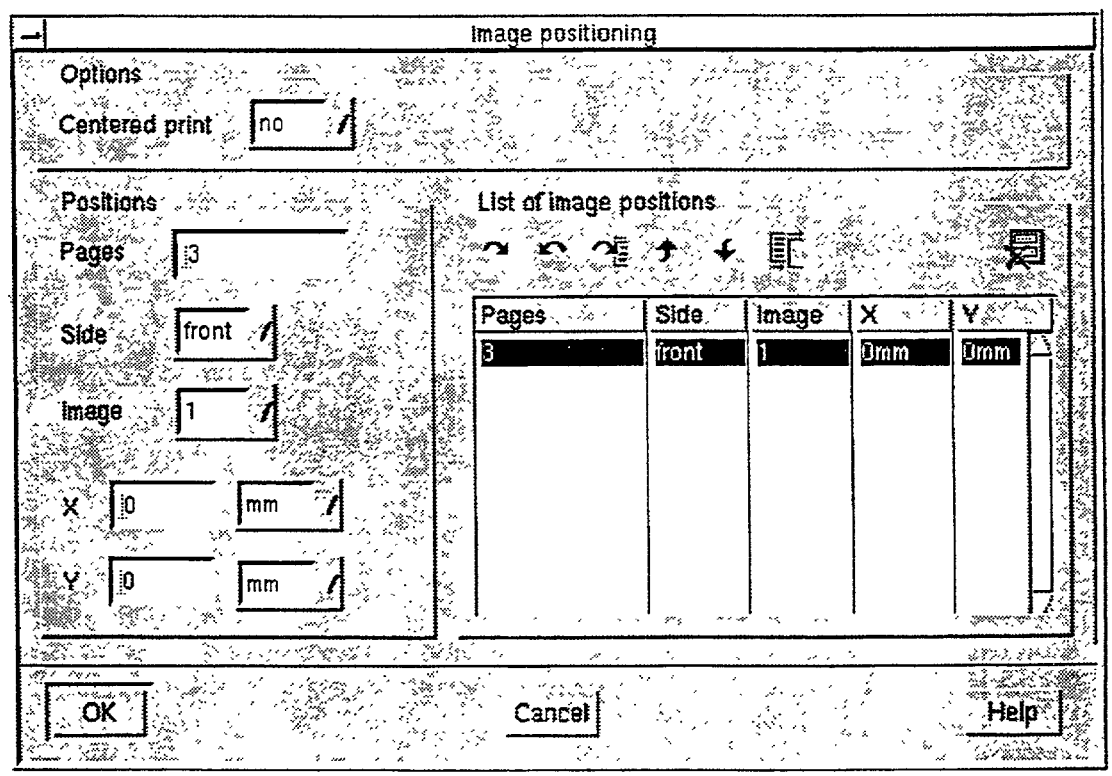
FIG. 9 is a dialog box or selection window for positioning the pages on the printed sheet.

The window shown in FIG. 9 is activated with the command button, "positioning", in the symbol field, "assemble. By way of exception, a sheet is referred to as "page" in this window. That the images of a page imposed on a sheet are to be printed centered can be optionally selected in this window. With this option, thus, it is possible to print the images, i.e. a printed paged, web-centered on a web-shaped recording medium, for example on paper. This option is particularly useful when the recording medium format specified in the print job does not exactly coincide with the format of the physical recording medium.

Figure 10:
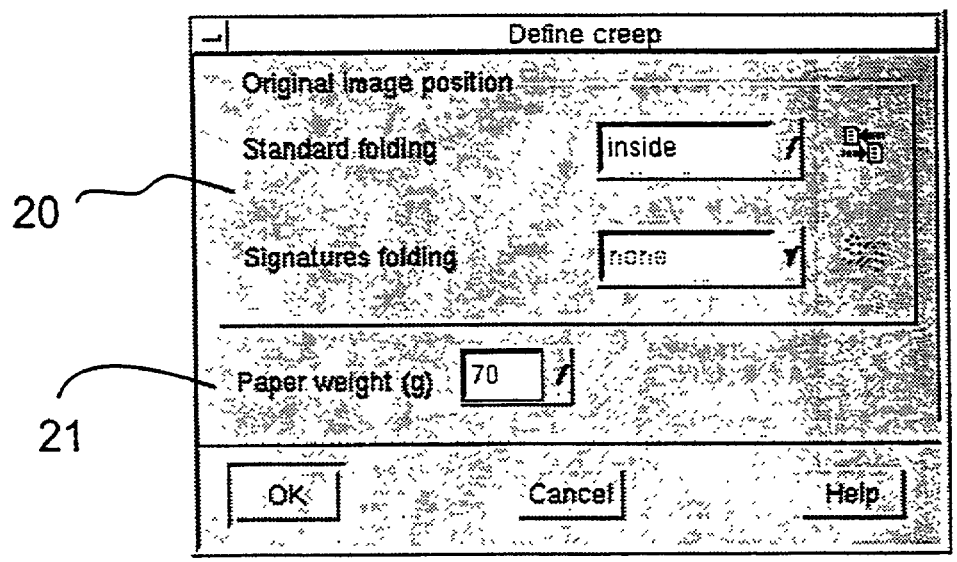
FIG. 10 is a dialog box or selection window for the type area correction.

FIG. 10 shows the input window with which the parameters for the initially described type area correction are defined given folded paper webs. Parameters about the nature of the folding are queried in the query field 20. The version, "standard folding" is selected when sheets are only folded around a single edge. This, for example, is the case when a paper web is printed, the paper web is cut into individual sheets, the individual sheets are placed on top of one another and, finally, all sheets are folded over a common edge and stitched together. A type of processing with the same result would be that individual sheets (cut sheets) having a smaller format such as, for example, DIN A4 or DIN A3 are printed, are then likewise placed on top of one another and, finally, folded over the common middle edge and stitched. The option, "inside" or "outside", defines whether the original page positioning on the inner sheet of the signature or on the outer sheet of the signature is preserved. This function is described in greater detail later in FIGS. 14a, 14b and 14c.

Whereas the version, "standard folding", is only selected for sheets that are folded over a single edge, the version, "signature folding", is selected when folding is carried out over two axes residing perpendicularly on one another. This version will be discussed in detail later on the basis of FIG. 15.

The specific weight of the paper (for example, 70 g/m$^2$) is input with the query field 21, "paper weight". Inventively, a correction quantity with reference whereto the individual offset of the print image on the page or, respectively, the quantities required for the type area correction are calculated is determined from this parameter. Details about this calculation are described in greater detail in conjunction with FIGS. 14a through 17.

In addition to or instead of the paper weight, further parameters of recording media, for example the type of material (paper, film, cloth), the thickness of the recording material or the like, can be indicated in the window, "define creep", in an alternative exemplary embodiment. It can also be provided to allocate these particulars to a specific signature (for example, signature No.12 in FIG. 8) and/or to undertake a corresponding allocation to one of several connected printer devices.

Figure 11:
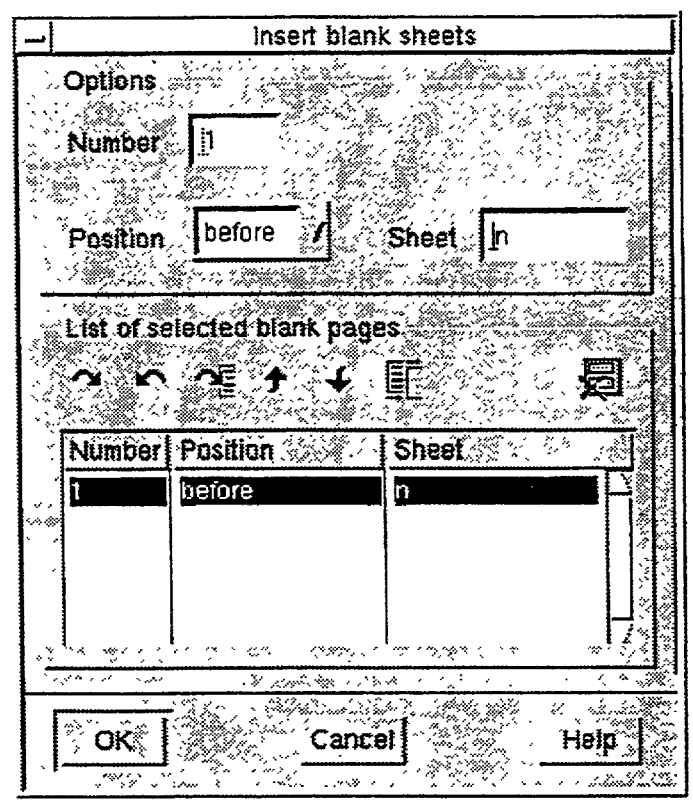
FIG. 11 is a dialog box or selection window for the insertion of blank printed sheets.

The input window for "blank sheets" shown in FIG. 11 allows inputs with which blank sheets can be inserted at specific positions before or after printed sheets. In ongoing printing operations, this can particularly ensue with an arrangement that is disclosed by European Patent Document EP 741 877 B1 or, respectively, in Published International Patent Application WO-A-95/20185 corresponding thereto. An external charging (EB) with which, for example, colored or separating sheets pre-printed elsewhere can be inserted into the sheet stream printed by the PoD printer device before the different sheets of a document are joined and bound to form the document is also provided with the buffer memory shown thereat in FIG. 1. The content of this earlier publication (EP '877) is incorporated by reference into the present specification.

The input window for "blank sheets" shown in FIG. 11 allows inputs with which blank sheets can be inserted at specific positions before or after printed sheets. In ongoing printing operations, this can particularly ensue with an arrangement that is disclosed by European Patent Document EP 741 877 B1. An external charging (EB) with which, for example, colored or separating sheets pre-printed elsewhere can be inserted into the sheet stream printed by the PoD printer device before the different sheets of a document are joined and bound to form the document is also provided with the buffer memory shown thereat in FIG. 1. The content of this earlier publication (EP '877) is incorporated by reference into the present specification.

Figure 12:
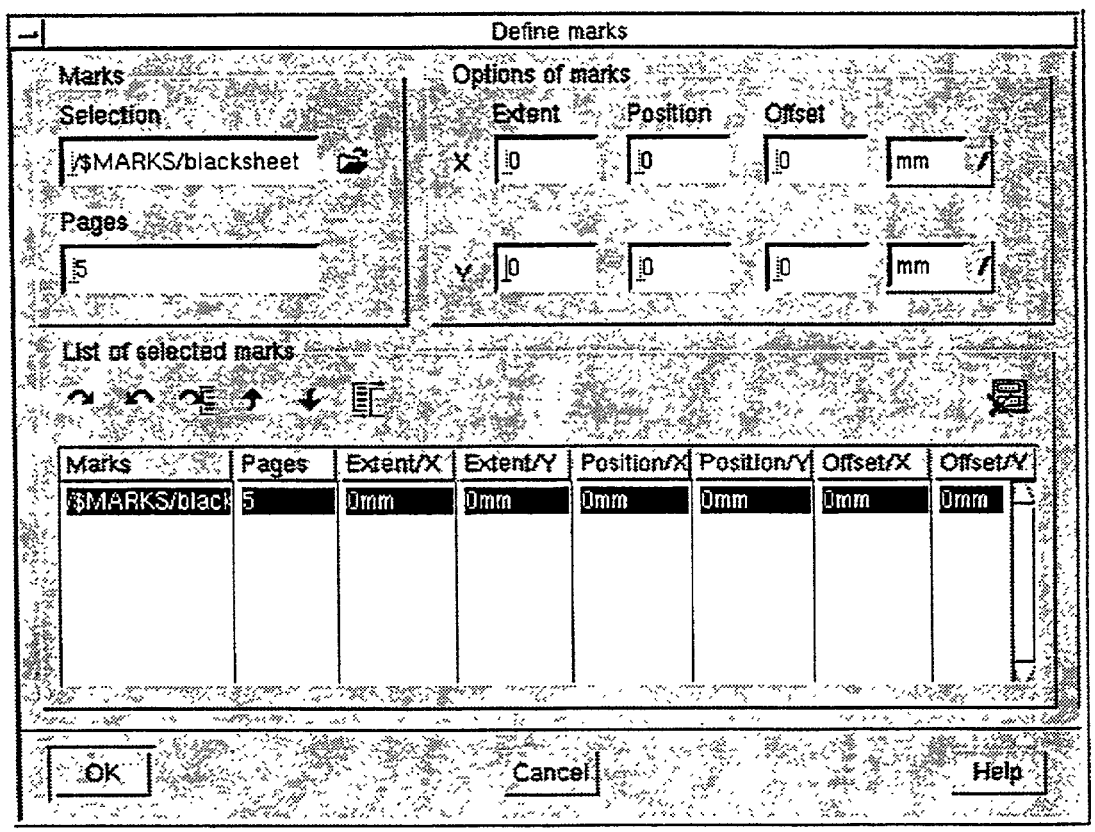
FIG. 12 is a dialog box or selection window for defining marks.

Marks, for example cut marks, end-of-job marks or other, user-specific marks, can be applied to specific pages of the imposed print data with the input window indicated in FIG. 12.

Figure 13:
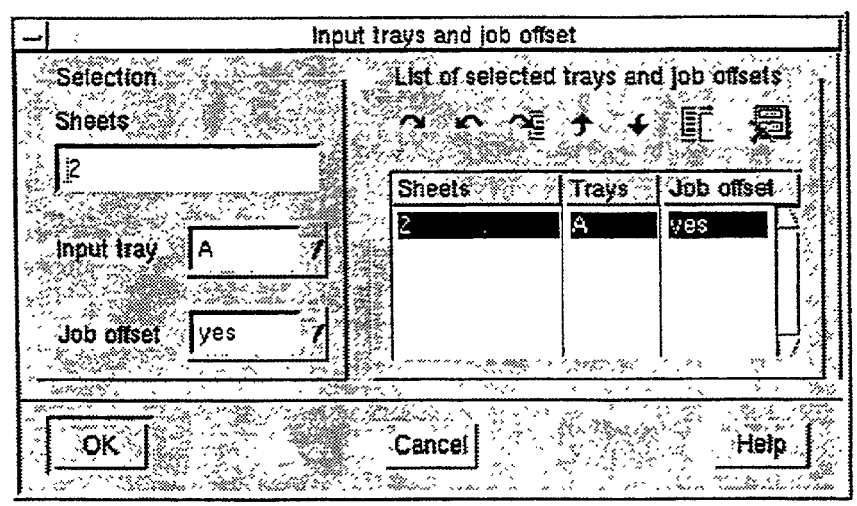
FIG. 13 is a dialog box or selection window for defining input trays of a job offset.
Figure 14:
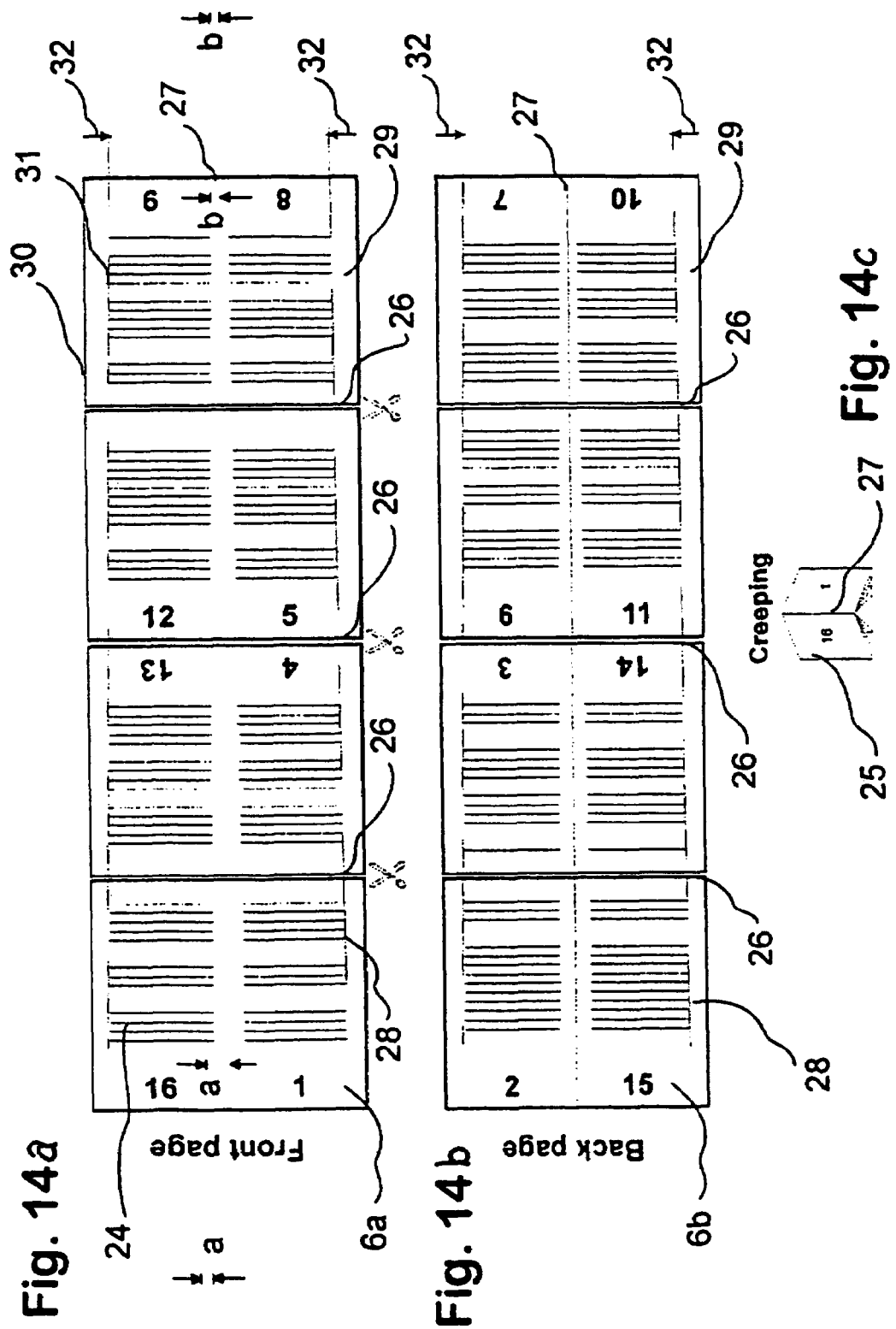
FIGS. 14a and 14b are front and back pages, respectively, of a signature pattern
FIG. 14c is a perspective view of the folded signature.

Paper input trays can be selected and a job offset function can be activated sheet-by-sheet with the input window shown in FIG. 13. These selection functions are particularly relevant given output with single-sheet printer devices. The job offset function makes it possible to sort the individual sheets (signatures) by signatures or, respectively, jobs and to thus potentially support a compile function that is implemented manually or by machine.

The command button, "print range", shown in FIG. 2 makes it possible to define a print range and to print only a sub-region of the datafile as an alternative to a complete print datafile. This is especially advantageous for a proof. As a result thereof, critical sub-regions can be tested, for example the print out of individualized regions of the print job or the overlay of various pages.

FIGS. 14a and 14b show both sides of a printed paper web on which a "two up" pattern is printed. The front side 6a of the paper web carries the page numbers 1, 4, 5, 8, 9, 12, 13 and 16, and the back side 6b of the paper web carries the page numbers 2, 3, 6, 7, 10, 11, 14 and 15. When it is assumed that a signature 25 as shown in FIG. 14c is formed from these 16 pages in that the paper web is respectively cut to sheets at the cut edges 26, successive sheets are placed on top of one another and, finally, are folded around the common center fold 27, then the following condition must be met so that pages following one another lie on top of one another with exact registration, i.e. a registration correction is implemented given standard folding.

The logical printed pages with the numbers 1, 2, 15 and 16 of the outer sheet 28 of the signature 25 must be placed farthest outside on the paper web, whereas the logical pages—the farther the sheets lie inside in the folded signature 25—must be positioned farther in toward the middle fold 27. The following thus applies mathematically:

$$a > b,$$

whereby 'a' references the distance of the print image of the pages of the outer sheet from the center fold 27 and 'b' references the distance of the print image of the pages of the inner sheet 29 from the center fold 27.

One effect of this type area correction (also referred to as a creep function) is that the outer edge 31 of the print image 24 is at an increased spacing from the lateral edge 30 of the paper web 6 from the outer sheet to the inner sheet. The shift of the print images thus ensues in the direction of the arrow 32 indicated in FIGS. 14a, 14b and 14c. The parameters "inside" or, respectively, "outside" in the query field 20 (FIG. 10) determine whether the original page positioning is to be preserved on the inner sheet 29 or on the outer sheet 28 of the signature 25. When the user decides in favor of the "inside" option, then the logical pages—proceeding from the inner sheet 29—migrate farther toward the outside opposite the arrow direction 32. When the "outside" option is selected, then the original position of the print image 24 on the outer sheet 28 is preserved, and the print images on all other sheets are shifted inward in the arrow direction 32 toward the center fold 27.

For calculating the sheet-by-sheet print image offset, conclusions about the paper thickness are drawn from the parameters (for example, specific paper weight) indicated in FIG. 10, a step width is calculated for the print image shift per sheet, and an individual correction shift value is defined for each page of the sheet. The following algorithm (algorithm 1) is applied for this purpose:

if (inside)
   pweights_init=0− weight*sheet_ges−1
else
   pweights_init=0
correction shift value=(pweights_init+weight*(lage−1))/ a*lunits*(dpi/STD_MPI),
whereby the following apply:
a=an empirically determined parameter for a specific paper grade; for example, a factor a=500 has proven beneficial for a standard paper with a specific weight of 80 g/m$^2$,
sheets_ges=plurality of sheets
weight=paper weight in grams/m$^2$ (for example, weight=80)
   (if "inside"=>negative operational sign, i.e.: −80)
lage=page position in the sheet, calculated according to algorithm 2
lunits=1 unit/pel
dpi=current resolution, for example 600 pel/inch
STD_MPI=25.4 mm/inch.

Instead of specifying the specific weight and the correspondingly stored value of the quantity 'a', the paper thickness value can be deposited in a table. A corresponding shift value is then determined for each sheet and the logical pages situated on the sheet. Instead of calculating the shift value, it is also possible to select or, respectively, input the shift value from the user. The sheet number or, respectively, the position of the page in the folded sheet is determined dependent on the page number. In the case of "standard folding", all sheets are folded around the center fold (27). The determination of the parameter "lage" then ensues according to the following algorithm (algorithm 2):

if
(page_nr<=pages_ges/2 and page_nr even-numbered)
then→lage=page_nr/2
else if
(page_nr<=pages_ges/2 and page_nr odd-numbered)
then→lage=(page_nr+1)/2
else if
(page_nr>pages_ges and page_nr even-numbered)
then→lage=(2*pages_ges/2−page_nr+2)/2
else if
(page_nr>pages_ges and page_nr odd-numbered)
then→lage=(2*pages_ges/2−page_nr+1)/2, whereby the following apply:
(page_nr)=page number, and
(pages_ges)=total number of pages.

The position determined in this way is the multiplier in algorithm 1 for the correction shift value of the corresponding page.

Example for the calculation of the correction shift according to the two algorithms that have been described:
Standard folding: "inside"
Paper weight (g/m$^2$): 80
Signature and page distribution as in FIGS. 14a, 14b and 14c
→weight=−80
→sheets_ges=4
→pweights_init=0−(−80*(4−1))=240
→correction shift=(240−80*(lage−1))/500*600/25.4
lage=1: correction shift value=0.48 mm (11 lunits)
lage=2: correction shift value=0.32 mm (8 lunits)
lage=3: correction shift value=0.16 mm (4 lunits)
lage=4: correction shift value=0.00 mm (0 lunits)

Figure 15:
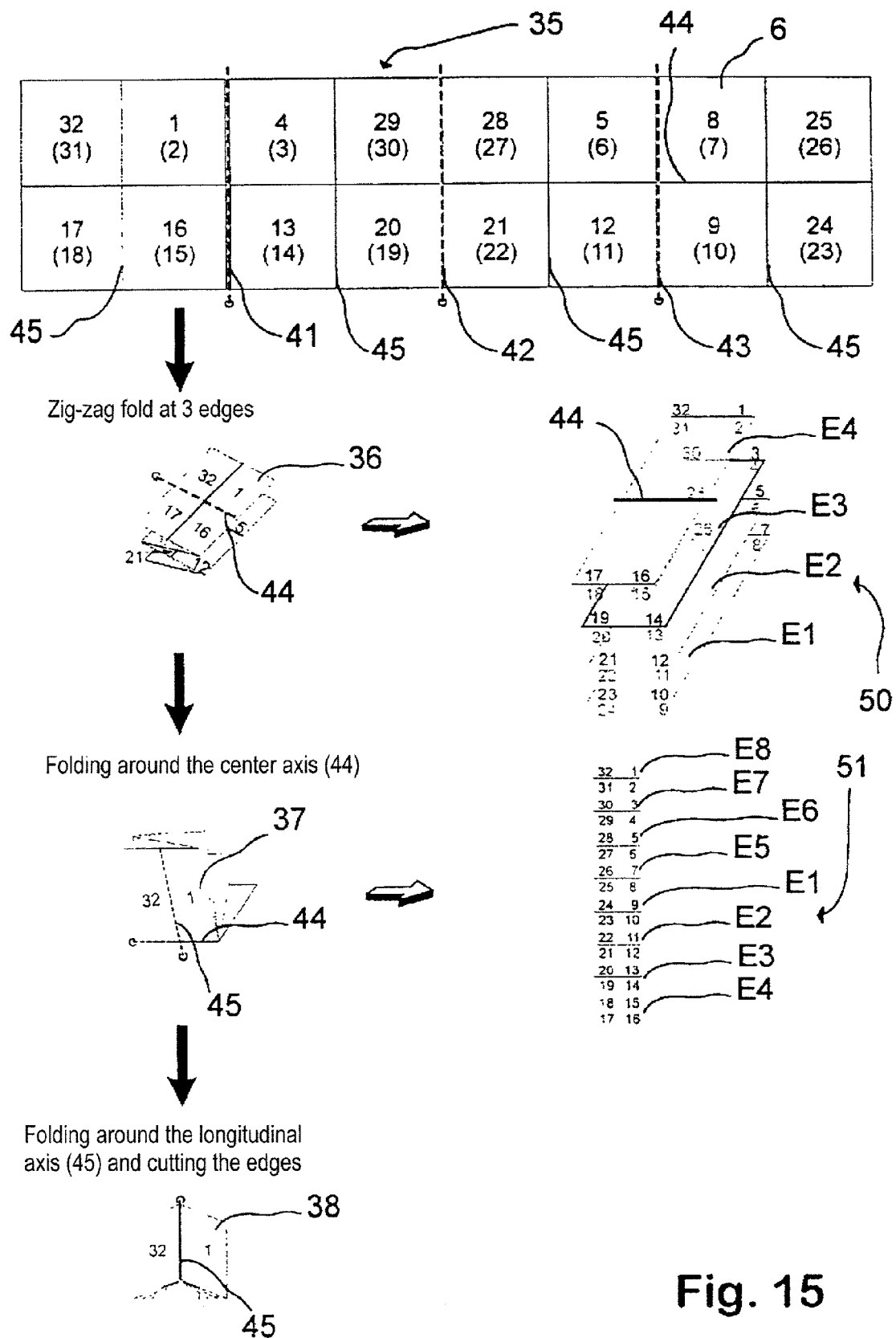
FIG. 15 is a step-by-step illustration showing an example for folding a signature.

FIG. 15 shown an imposition pattern 35 for a signature printing wherein folds ensue in folding axes that are perpendicular to one another. The imposition pattern 35 comprises 32 logical pages, whereby the numbers of the pages that are printed on the front side of the paper web 6 are referenced without parentheses, and the number of the pages that are printed on the back side of the paper web are provided with parentheses. Page 1, thus, is printed on the front side, whereas page 2 is printed on the back side.

The signature or, respectively, the sheet allocated to this signature comprises 32 pages. The folding event ensues in a plurality of steps, whereby the result of the folding due to the reading sequence of the finished printed matter (page sequence 1, 2, 3, . . . 32) is already fixed in advance. It follows therefrom that the folding event is an event that can be unambiguously described. Given the example shown in FIG. 15, the event can be subdivided into three sub-steps.

A zig-zag folding at the three fold edges 41, 42 and 43 ensues in the first sub-step. This procedure leads to the folded sheet 35. When this sheet 36 is folded over the folding axis 44, then the folded sheet 37 arises in the second sub-step. This is folded around the center fold axis 45 in the third sub-step and cut at the remaining axes, the signature 38 arising as a result thereof.

The folding events that have just been described can be described in the following way, logically abstracted:

In an n-dimensional space, let the logical page numbers be arranged corresponding to their positions on the recording medium and to the folded condition of the latter. When, for example, all pages of the paper web given a two-up printing are situated in a plane (level) corresponding to the situation during printing, then the space is four-dimensional corresponding to the front side or, respectively, the back side of the recording medium and a respective row and a column. The dimension is increased at least in regions with specific folding operations. For example, the dimension is doubled by a folding for all those positions that are folded onto one another.

It can be seen with reference to the example of FIG. 15 that the space multiplies to a dimension 16 with the first sub-step, i.e. with the zig-zag fold. In the diagram 50, the logical page arrangement is correspondingly indicated with four levels E1, E2, E3 and E4 each having two pages (front side and back side), one respective row and one respective column. After the folding around the center axis 44, the level structure 51 then derives that has exactly twice the number of levels as the level structure 50, namely 8 levels (E1, E2 E3, E4, E5, E6, E7 and E8) each having two pages. Accordingly, the space to be described is 32-dimensional.

Such a logical level structure can be imaged without further ado in data-oriented terms by corresponding tables or variables with addresses (pointers). Accordingly, the physical folding of sheets can be simulated without further ado in data-oriented terms.

Figure 16:
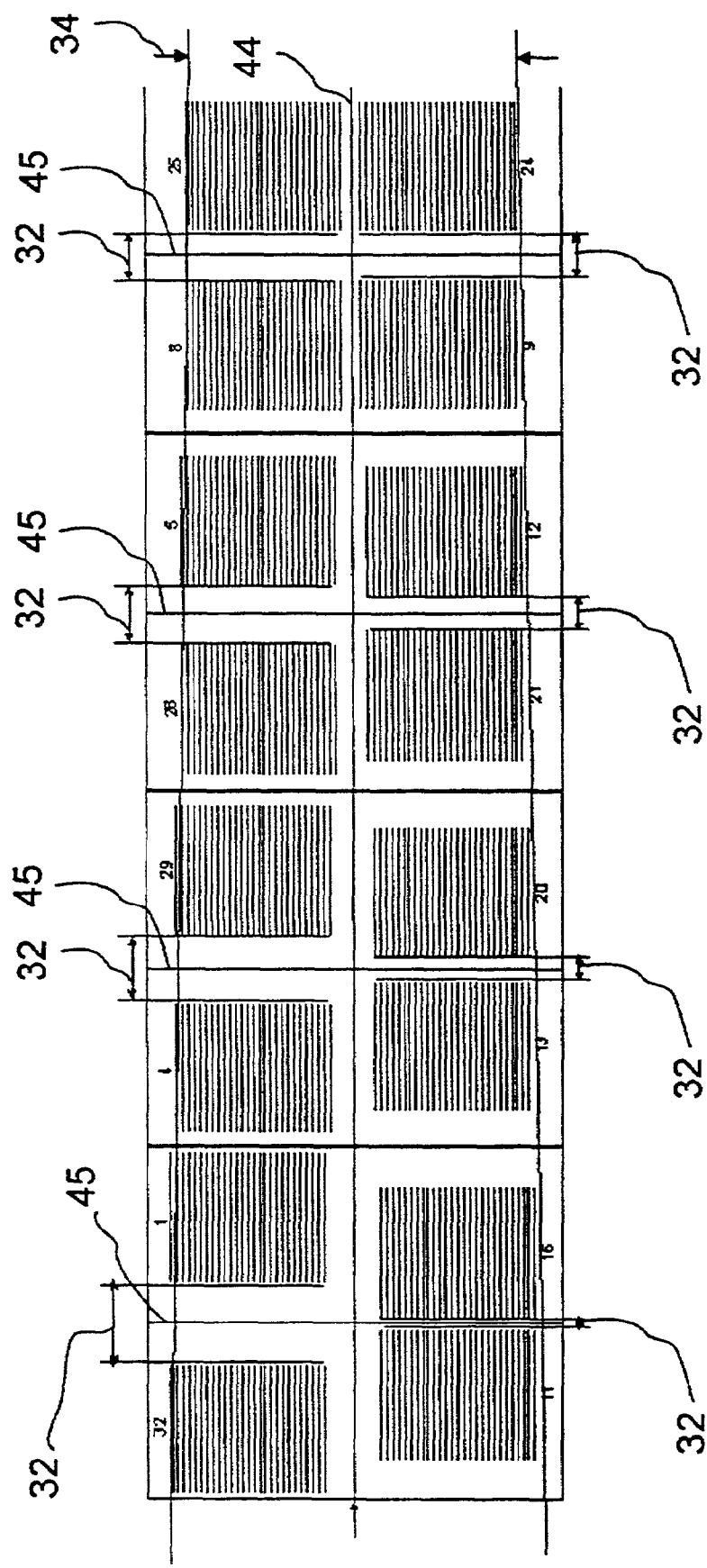
FIG. 16 shows the print image of a page sequence that has had type area correction.

As shown in FIG. 16, a fold-conditioned position shift of the printed pages within a signature can be replicated from the simulated folds and from the knowledge of the paper web thickness and, thus, can also be corrected. This position correction then ensues not only along one axis as in FIGS. 14a, 14b and 14c but also along a second fold axis that is perpendicular to the first axis. Whereas—as was already the case in FIG. 14a—the print image shifts ensues along the arrow direction 32 corresponding to the folding relative to the center fold axis 45, additional print image shifts along arrow 34 and corresponding to the signature folding around the fold axis 44 that are perpendicular thereto are provided given the signature folding shown in FIG. 16.

The algorithm with which the distribution of the pages, the structure of the sheet filled with pages can be constructed and the folding can be simulated step-by-step is described on the basis of FIGS. 17 and 18. What effect the respective folding has is then known from this simulation. A position correction of the printed pages can thus be implemented fold-by-fold.

Figures 17A, 17B:
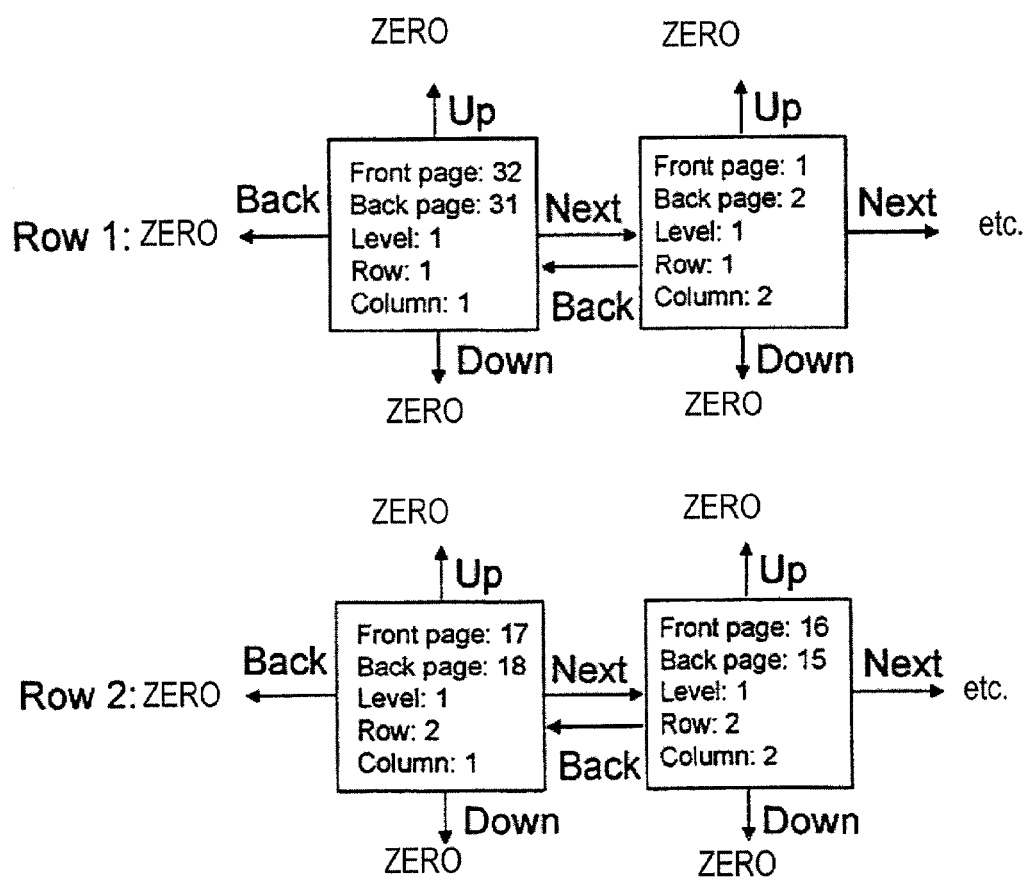
FIGS. 17a and 17b show an imposition strategy.

The algorithm proceeds from the distribution of the pages on the paper web, which is known from the imposition sequence (i.e. the parameter set prescribed in the "impose" work step). FIGS. 17a and 17b show the initial condition of the unfolded sheet, whereby FIG. 17a shows the physical sheet and FIG. 17b shows the corresponding logical and computer-convertible fold model equipped with logical variables (front page, back page, level, row, column, up, down) or, respectively, pointers in the form of a list structure for the signature.

Figure 18A:
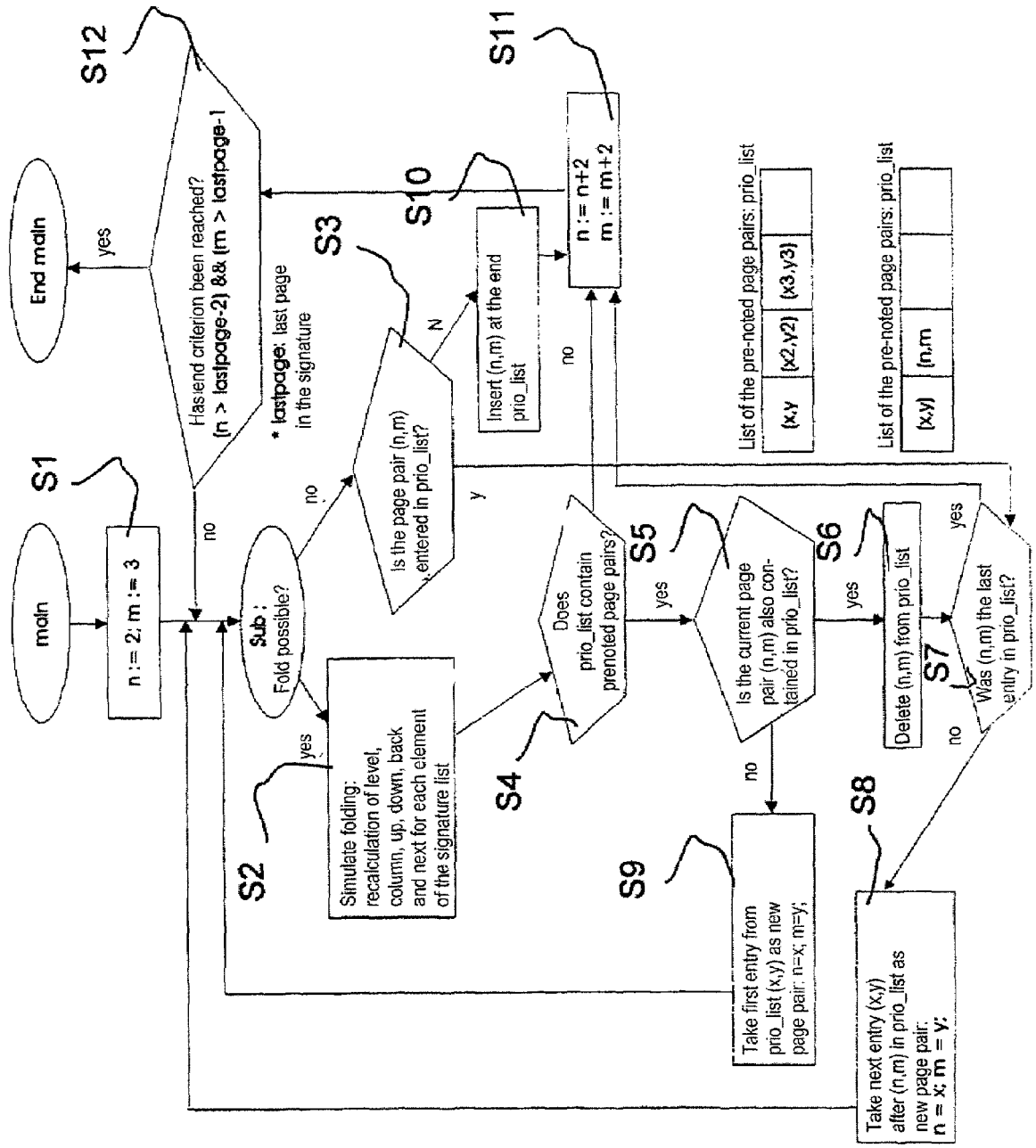
FIGS. 18a and 18b show a flowchart directed to the type area correction.
Figure 18B:
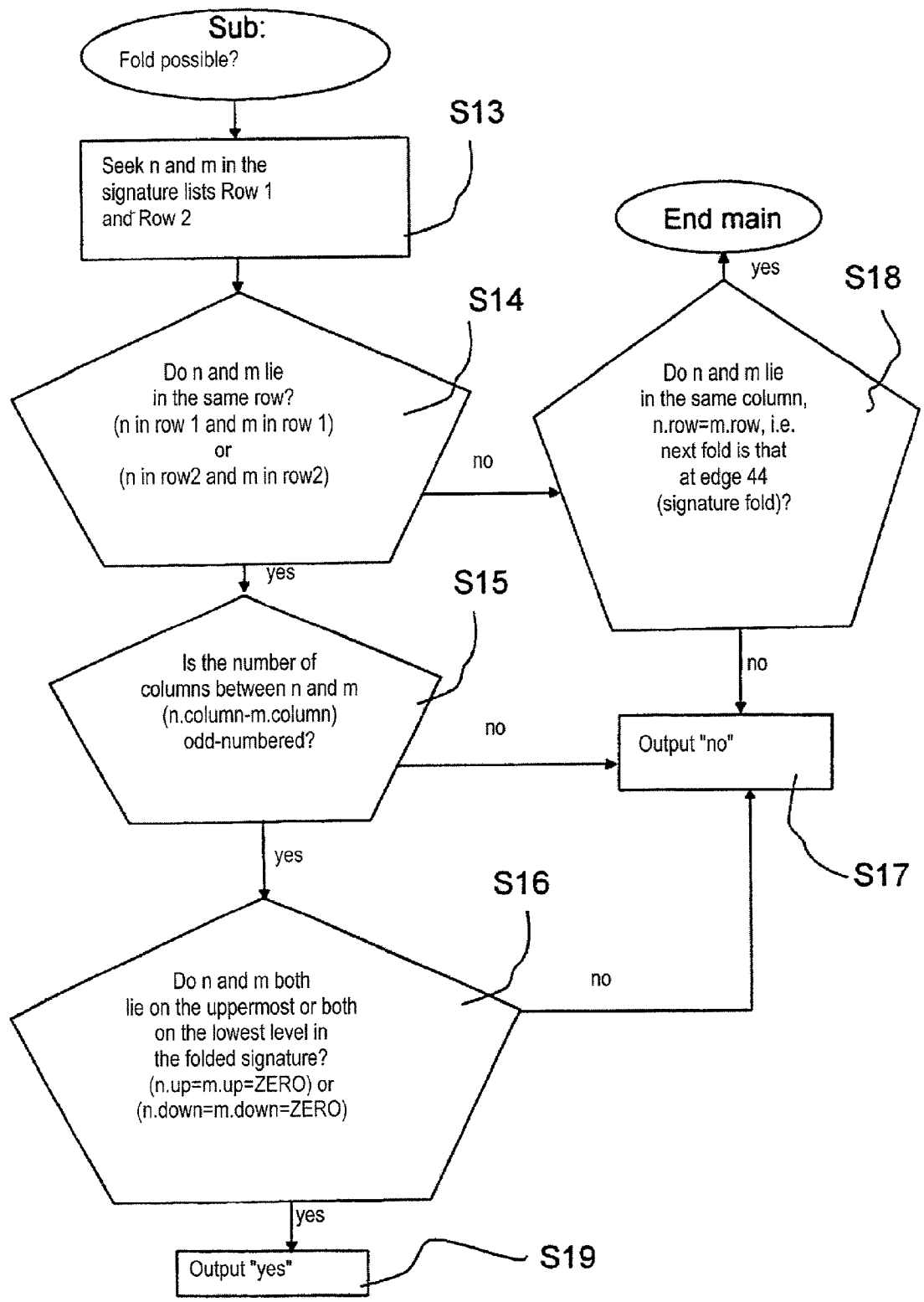

Proceeding from the condition shown in FIGS. 17a and 17b, which page pair should folded onto one another next is successively determined according to FIG. 18a. In step S1, a counter n is pre-occupied with 2 and a counter m is pre-occupied with 3 for this purpose, corresponding to the second and third page. Subsequently, the sub-program, "Folding possible?", is started, see FIG. 18b.

In step S13, the pages n and m are first sought therein in the two rows Row1 and Row2. Subsequently, three criteria are checked off in succession. A check is carried out in step S14 to see whether the two pages to be folded onto one another lie in the same row. If not, a finding is made next in step S18 as to whether the two pages n and m lie in the same column. When this is true, the program is ended, since the next fold is a matter of the signature fold (edge 44) around the second axis (residing perpendicular to all previous fold axes). Otherwise, a "no" output ensues (step S17); the two pages cannot be folded since they lie neither in the same row (step S17) nor in the same column (step S18).

When the query is step S14 os answered with yes, then the difference between the two column numbers of the pages n and m is formed next (step S15). When the difference yields an odd-numbered value, one can continue with step S16; otherwise, the output "no" ensues (step S17). Step S16 determines whether the pages n and m both lie on the lowest level or uppermost level in the folded signature as well as whether both pages are a front side or a back side. When this is the case, the pages can be folded onto one another in the current step and a "yes" output ensues (step S19). Otherwise, "no" is output (step S17).

When the return of the sub-program, "Folding possible?", into the main program (FIG. 18a) ensues with the output "no", then a check is carried out there to see whether the current page pair also exists as an entry in the list of the page pairs that were noted in advance (step S3). When this is not the case, then the current page pair is entered at the end of the list or pre-noted page pairs, "prio_list" (step S10) and, in step S11, the page counter for both elements of the page pair (n,m) is incremented by an offset of 2. Otherwise, one continues with step S7.

When, in contrast, the return from the sub-program (FIG. 18b) into the main program (FIG. 18a) ensues with the parameter, "yes", then the folding of the page pair onto one another is simulated in the main program, and the signature list (FIG. 17b) is updated (step S2). A new page pair for which a folding is to be attempted must be found in the following steps. To this end, a check is carried out to see whether entries are present in the list for pre-noted entries (step S4). When this is the case, then a further check is carried out to see whether or not the current page pair (n, m) is also already contained in this list (step S5). If yes, then this can be removed from the list (step S6) since it was capable of being successfully folded (in step S2). When the pair (n, m) is not contained in the prio_list, the first page pair in the list becomes the new, current page pair for which a folding is attempted (step S9). When the query in step S4 does not apply, then one continues with step 11.

When the pair (n, m) was an element of the prio_list (step S5, S6), then a determination as to whether it resided at the end of this list is made in step S7. If not, then the next page pair after (n, m) in the list becomes the new, current page pair (step S8). When, however, the query in step S7 is answered with yes, then the page counter for both elements of the page pair (n, m) is incremented by an offset of 2 in the step 11. A check must thereby always be carried out in step 12 to see whether the values for n and m already lie outside the signature (n>total number of pages−2, m>total number of pages−1). The simulation program ends in this case; otherwise, a a folding is attempted anew for the new page pair (n, m).

Since the total number of pages on the sheet is known, attempts to fold are carried out until folding is no longer possible, i.e. either the sheet has been completely folded (folding around axis 44 has been reached) or the program determines that the pages are arranged on the sheet such that further folding is no longer possible. In this case, an error message is output.

The position in the folded sheet was calculated for each page. The shift correction for the signature folding for each individual page is calculated dependent on this position and on the paper thickness (derived from the paper weight, which was previously input).

Figure 19:
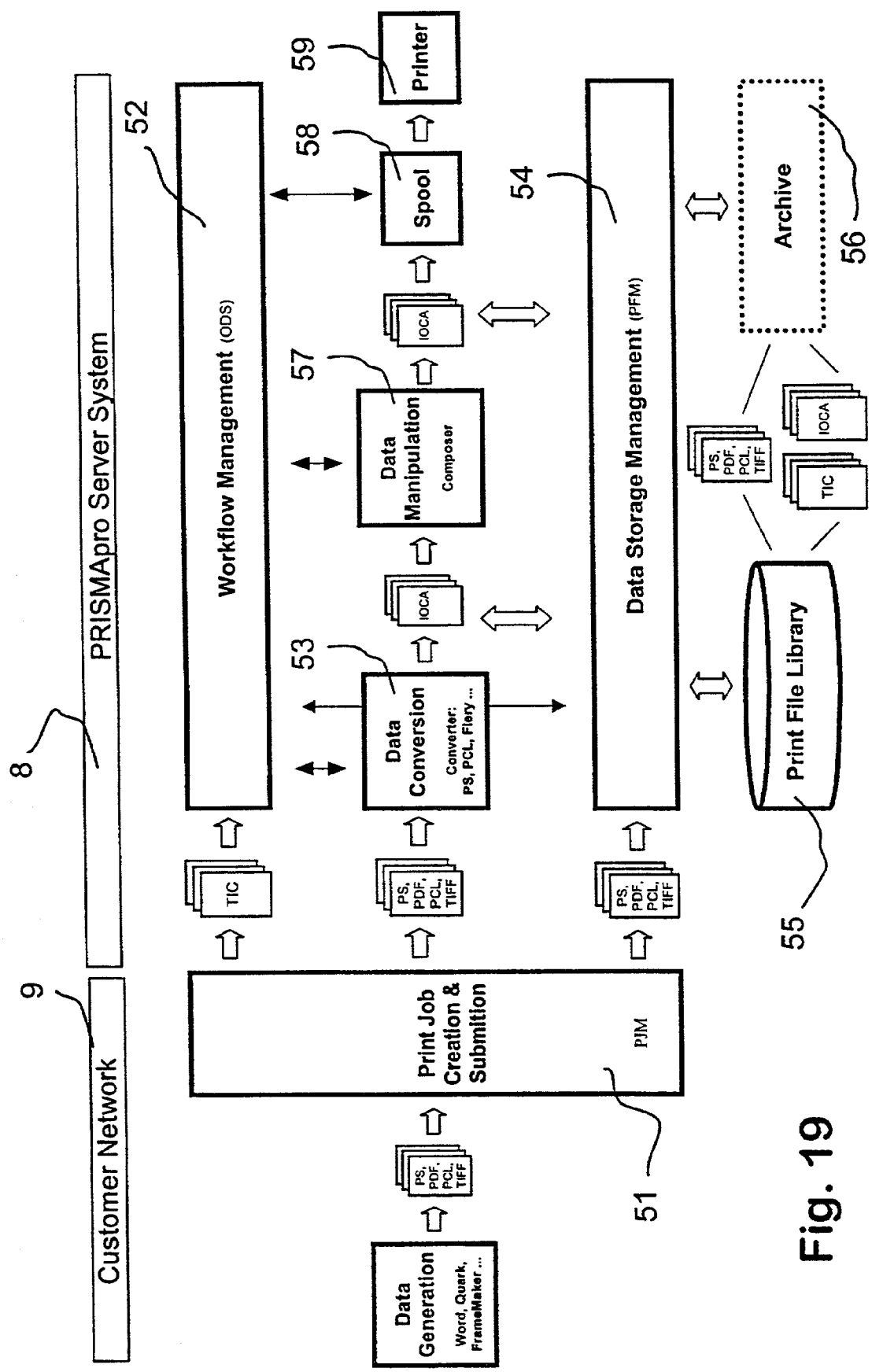
FIG. 19 is a work sequence diagram.

FIG. 19 again shows an overview of the data-oriented work sequence (workflow) of an inventive system according to FIG. 1. The data (PS, PDF, . . . ) generated in a first network 9 (for instance, a customer network), for example from the programs Microsoft Word (registered trademark of Microsoft, Inc.), Quark (registered trademark of Quark, Inc.) or Frame Maker (registered trademark of Adobe Systems, Inc.), are thereby supplied to a print job manager 51 (PJM) either still within the network 9 or already within a print environment network 8. This print job manager first generates print job-specific data and commands such as a printer identification, a job class, etc. Then, on the one hand, it sends control data (TIC) to a control program 52 (order distribution system ODS) and, on the other hand, sends the print data (PS, PDF, . . . ) to a data converter 53, for example to the RIP 3 shown in FIG. 1. Optionally, it can also send the print data to a data storage system 54 (print file manager PFM) that administers print datafiles of the most varied formats in a print file library 55 and that can send the datafiles as needed to an external archiving system 56, for example to what is referred to as a COLD system for storage on a CD-ROM.

The print data converted into a new data stream (IOCA) in the data converter are then supplied to the composer 57, in which the imposition pattern is defined and the other steps described in conjunction with FIGS. 2 through 18 for modifying the print data stream can be undertaken. The print data adapted in this way are then supplied to a print data spooler 58 that forms a queue and finally sends the print data to the printer 59 (see the printer 6 of FIG. 1). The order distribution system 52 controls the events in the modules 53, 57 and 58 in an inter-system fashion.

Exemplary embodiments of the invention were described. It is thereby clear that arbitrary developments and modifications as well are possible. In addition to the parameters that have already been described for the implementation of the type area correction, for example, further influencing quantities (parameters) effected by post-processing devices such as folding equipment or binding equipment can be involved in the correction calculation. Such parameters can also be selectably pre-defined.

The invention is particularly suited for being realized in a computer program (via software). It can thus be distributed in the form of a computer program module, as a datafile on a data carrier such as a diskette or a CD-ROM or as a datafile via a data or, respectively, communication network. These data files and comparable computer program products are incarnations of the invention. The inventive executive sequence can be applied in a computer, in a printer device or in a printing system with a following processing devices. It is thereby clear that the computer on which the program runs can contain known technical devices such as an input means (a keyboard, mouse, touch or screen), a microprocessor, a data and control bus, a display device (a monitor, or display) as well as a main memory, a hard disk storage and a network card.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A computer-implemented method for signature-by-signature editing of print data, the method being performed by a computer executing a computer program having a data structure stored on a tangible computer readable medium, comprising the steps of:

editing the print data for printing on a web-shaped recording medium in a logical page sequence corresponding to at least one signature, said at least one signature forming a section of a printed product and including a plurality of pages;

defining at least one parameter of said recording medium on which the print data are printed and that is relevant for a position of a print image on the recording medium folded in signatures;

implementing a position correction of the respective print image on the pages before printing dependent on said at least one parameter; and computationally simulating folds of said recording medium needed for producing said at least one signature with assistance of the computer program so that the print images of successive pages of the folded signature lie exactly registered above one another, the folds ensue in two directions perpendicular to one another, and said position correction ensues in the two directions perpendicular to one another, the print data being provided on said recording medium, said step of computationally simulating performing simulating of the folds of the signature for said position correction; and calculating correction values for the print image of a page from an influence of each fold on a print image of at least one page;

said simulating step simulating the folds for said position correction page-by-page with ascending or descending page number, and forming pairs of successive page numbers that due to the signatures at least one of: come to lie on one another as a result of a fold, and between which a fold is provided due to the signature.

2. A method according to claim 1, further comprising the steps of:

carrying out a successive check out to see whether a physical fold of said recording medium is possible as a result whereof the pages of a page pair of successive pages are arranged in reading sequence after said recording medium is folded to form the signature; and implementing a data-oriented fold when a fold is possible and entering the page pair in a list when a physical fold cannot be implemented.

3. A method according to claim 2, further comprising the step of:

processing page pairs present in the list with priority over other page pairs until a non-foldable page pair in the list is processed.

4. A method according to claim 1, wherein said parameter is a thickness of the recording medium.

5. A computer-implemented method as claimed in claim 1, wherein said step of computationally simulating folds includes simulating zig-zag folding of the web-shaped recording medium.

6. A computer-implemented method as claimed in claim 1, wherein said web-shaped recording medium is a continuous web of the recording medium as used in a web-fed printing system.

7. A printing system, comprising:

at least one computer; and a printer device connected to said at least one computer;

a computer program including a data structure stored on a tangible computer readable medium and executable by said at least one computer for implementing steps of:

editing the print data for printing on a web-shaped recording medium in a logical page sequence corresponding to at least one signature, said at least one signature forming a section of a printed product and including a plurality of pages;

defining at least one parameter of said recording medium on which the print data are printed and that is relevant for a position of a print image on the recording medium folded in signatures;

implementing a position correction of the respective print image on the pages before printing dependent on said at least one parameter; and computationally simulating folds of said recording medium needed for producing said at least one signature with assistance of the computer program so that the print images of successive pages of the folded signature lie exactly registered above one another, the folds ensue in two directions perpendicular to one another, said simulating folds being implemented page by page, and said position correction ensues in the two directions perpendicular to one another, the print data being provided on said recording medium.

8. A printing system according to claim 7, further comprising:

at least one post-processing device that at least one of cuts and folds and binds said recording medium printed by said printer device to form a printed product.

9. A printing system according to claim 8, wherein binding ensues in signatures.

10. A computer program product including a computer program as a data structure stored on a tangible computer readable medium and executable on a computer for implementing steps of:

editing the print data for printing on a web-shaped recording medium in a logical page sequence corresponding to at least one signature, said at least one signature forming a section of a printed product and including a plurality of pages;

defining at least one parameter of said recording medium on which the print data are printed and that is relevant for a position of a print image on the recording medium folded in signatures;

implementing a position correction of the respective print image on the pages before printing dependent on said at least one parameter; and computationally simulating folds of said at least one sheet needed for producing said at least one signature with assistance of the computer program so that the print images of successive pages of the folded signature lie exactly registered above one another, the folds ensue in two directions perpendicular to one another, and said position correction ensues in the two directions perpendicular to one another, said simulating folds being implemented page by page in ascending or descending page sequence, the print data being provided on said recording medium.

11. A computer on which a computer program product stored on a tangible computer readable medium and having a data structure that is executable on the computer is loaded into the computer to perform the steps of:

editing the print data for printing on a web-shaped recording medium in a logical page sequence corresponding to at least one signature, said at least one signature forming a section of a printed product and including a plurality of pages;

defining at least one parameter of said recording medium on which the print data are printed and that is relevant for a position of a print image on the recording medium folded in signatures;

implementing a position correction of the respective print image on the pages before printing dependent on said at least one parameter; and computationally simulating folds of said recording medium needed for producing said at least one signature with assistance of the computer program so that the print images of successive pages of the folded signature lie exactly registered above one another, the folds ensue in two directions perpendicular to one another, and said position correction ensues in the two directions perpendicular to one another, said simulating folds being implemented page by page in ascending or descending page sequence, the print data being provided on said recording medium.

* * * * *